United States Patent
Idel

[11] 3,783,714
[45] Jan. 8, 1974

[54] BAND SAW GRINDER
[76] Inventor: Vladimir Viktorovich Idel, ulitsa Gertsena 3, kv. 37, Zavolzhie Gorkovskoi Oblasti, U.S.S.R.
[22] Filed: Oct. 24, 1972
[21] Appl. No.: 300,414

[30] Foreign Application Priority Data
Oct. 25, 1971  U.S.S.R............................. 1706658
Feb. 22, 1971  U.S.S.R............................. 1746568

[52] U.S. Cl. .................................................. 76/37
[51] Int. Cl............................................. B23d 63/12
[58] Field of Search ................... 76/37, 41, 43, 112

[56] References Cited
UNITED STATES PATENTS
3,611,839  10/1971  Idel ......................................... 76/37
2,434,691  1/1948  Fields ...................................... 76/37
2,427,754  9/1947  Wahlstran .............................. 76/37
2,229,644  1/1941  Elder ....................................... 76/37

Primary Examiner—Harrison L. Hinson
Attorney—John C. Holman et al.

[57] ABSTRACT

A band saw grinder wherein the saw-holding device comprises a flexible appliance for holding the side surfaces of the saw, a flexible appliance for holding the back surface of the saw, located before the grinding wheel in the direction of saw pitch feed with relation to the grinding wheel, and an additional flexible appliance for holding the back surface of the saw, located after the grinding wheel in the direction of pitch feed. The provision of the additional appliance ensures identical profiles of the saw teeth throughout the length of the saw.

4 Claims, 9 Drawing Figures

BAND SAW GRINDER

The present invention relates to band saw grinders.

Known in the prior art are band saw grinders comprising a bed which mounts a grinding head with a grinding wheel and mechanisms for feeding the saw onto the grinding wheel and longitudinally relative to said wheel. Besides, these grinders comprise a device for holding the saw in a floating position in the course of grinding, said device being located in the saw grinding zone. The saw-holding device includes a flexible appliance for holding the side surfaces of the saw, flexible appliance for holding the back surface of the saw, and two supporting elements, one located close to the grinding wheel while the other, at a certain distance from it in the direction contrary to the longitudinal feed.

The device for holding the saw in a floating position, decribed above, provides for a grinding rate of up to 400 teeth per minute. At the initial moment of grinding, when the grinding wheel comes in contact with the side of the tooth, the saw turns through a certain angle with relation to one of the supporting elements. Later on the saw will tend to return to the initial position, i.e., to contact the supporting elements with the points of its teeth. Before the end of tooth grinding, the points of the saw teeth will touch upon the supporting elements and thus the tooth profile will be formed.

Some time after the beginning of grinding, the guides of the appliances for holding the side surfaces of the saw become soiled with abrasive dust, oil, metal particles, etc.

Soiling of the guides hampers the movement of the saw so that it fails sometimes to return to the initial position, i.e., to the point where the tooth points come in contact with the supporting elements. This may lead to distortion of tooth geometry at some points along the saw blade.

An object of the present invention resides in providing a saw grinder which would provide stable geometry of the teeth throughout the length of the saw.

In accordance with this and other objects we hereby claim a band saw grinder wherein the device for holding the saw comprises a flexible appliance for holding the side surfaces of the saw and another flexible appliance for holding the back surface of the saw, both appliances being assembled in a body secured on the feed carriage; the appliance for holding the back surface of the saw is located in front of the grinding wheel in the direction of the longitudinal pitch feed of the saw; besides, the machine comprises two elements supporting the points of the saw teeth, one of the elements being located near the grinding wheel while the other one, at a certain distance from it in the direction contrary to the pitch feed, and wherein, according to the invention, the body of the device accommodates an additional flexible appliance for holding the back surface of the saw, this appliance being provided with a supporting roller which is in constant flexible contact with said surface of the saw in the course of grinding and is located after the grinding wheel in the direction of pitch feed.

It is practicable that the additional flexible appliance should be made in the form of a lever whose fulcrum is secured in the body in the direction perpendicular to the back surface of the saw, and which carries a supporting roller contacting said surface of the saw and a spring-loaded slider installed in front of the grinding wheel in the guides arranged in the body across the side surface of the saw and having a slot for connection with the end of the lever for turning the latter.

Such a design of the additional appliance proves to be most compact and simple.

It is no less practicable that the body accommodating the flexible saw-holding appliances should be of a stepped shape, the smaller step accommodating the lever of the additional appliance in which case the grinding wheel housing is of a split type and is secured on this step of the body.

Such a design of the body of the saw-holding device makes it possible to enclose the grinding wheel round its entire circumference, i.e., 360°.

It is also practicable that an additional supporting element should be provided before the supporting element which is installed near the grinding wheel and that the supporting roller of the additional appliance should be installed between these supporting elements which will allow grinding the teeth of short-blade saws.

The band saw grinder according to the present invention ensures a stable profile of the teeth throughout the length of the saw at high grinding speeds e.g., up to 400 teeth per minute irrespective of the degree of soiling of the saw-holding appliances while the possibility of enclosing the grinding wheel around 360° allows sucking away abrasive dust from the grinding zone. Besides, the machine is compact and simple in operation.

Now the invention will be described in detail by way of example with reference to the accompanying drawings, in which.

Figure 1:
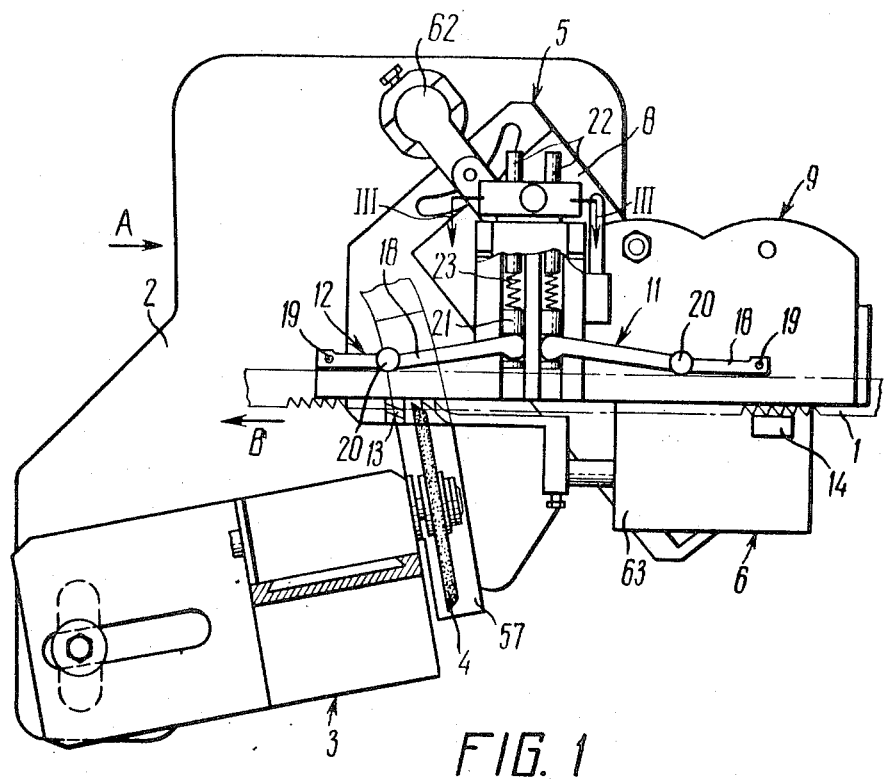
FIG. 1 is a top view of the band saw grinder according to the invention with the first version of the additional appliance.
Figure 2:
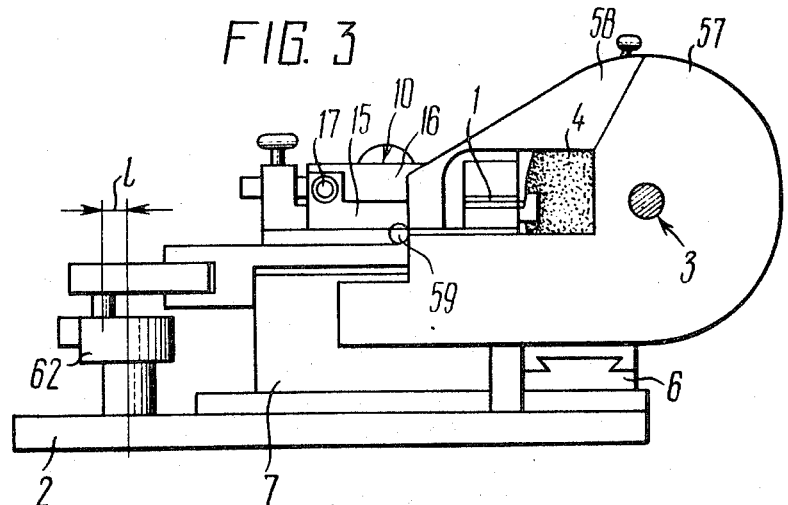
FIG. 2 is a view along arrow A in FIG. 1.

A band saw grinder 1 (FIGS. 1, 2) comprises a bed 2 mounted on which are a grinding head 3 with a grinding wheel 4. On the same bed are installed a mechanism 5 for feeding the saw 1 onto the grinding wheel 4 and a mechanism 6 for longitudinal pitch feed of the saw relative to said grinding wheel.

The body 7 of the feed mechanism is mounted with a carriage 8 secured on which is a device 9 for holding the saw 1 in a floating position. This device consists of a flexible clamping appliance 10 for holding the side surfaces of the saw; a flexible clamping appliance 11 for holding the back surface of the saw 1; and additional flexible clamping appliance 12 for holding the back surface of the saw; and supporting elements 13 and 14 on which the tooth points of the saw 1 rest.

The appliances 10 and 11 are located in front of the grinding wheel 4 in the direction of the pitch feed (this direction is shown by arrow B).

The device 9 has a body consisting of a lower part 15 and an upper part 16. These parts are interconnected by a hinge 17 and loaded by a spring so that the saw 1 is free to move in the appliance 10. This appliance consists of rollers (not shown in the drawings) facing each other and located in the upper 16 and lower 15 parts of the body.

Installed on the lower part 15 of the body are the supporting elements 13 and 14 on which the tooth points of the saw 1 rest. The supporting element 13 is located near the grinding wheel 4 whereas the supporting element 14 is installed at a certain distance from it in the direction contrary to the pitch feed.

The flexible clamping appliances 11 and 12 for holding the back surface of the saw are of an identical design and located symmetrically.

Inasmuch as the flexible clamping appliance 11 and the additional appliance 12 are identical, the following description of one of them applies equally to the other one too.

The appliance 11 (12) is a lever 18 whose fulcrum 19 is secured on the lower part 15 of the body in the direction across the back surface of the saw 1.

The lever 18 carries a supporting roller 20 which interacts with the back surface of the saw 1.

The free end of the lever 18 is located in a slot of a slider 21 which is installed in the guides located in the lower part 15 of the body in the direction across the saw blade (its side surface). The end of an adjusting screw 22 enters the same guides. A spring 23 located between the free end of the adjusting screw 22 and the slider 21 can be adjusted for tension thus changing the force with which the roller 20 presses the back surface of the saw 1.

Figure 3:
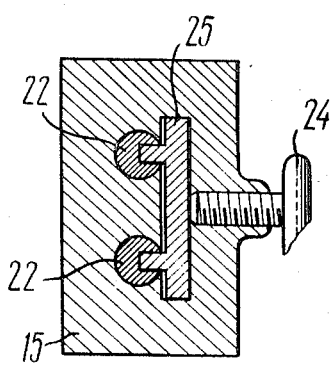
FIG. 3 is a section taken along line III—III in FIG.1.

The adjusting screws 22 of the appliances 11 and 12 are held in the required position by a screw 24 (FIG.3) via a strip 25.

In the other version of the device 26 (FIG.4) the appliance 27 for holding the back surface of the saw 1 consists of a case 28 (FIG.5) installed in the lower part 15' of the body and a spring-loaded rod 29 arranged coaxially with said case.

Installed on an axle 30 in the case 28 at the side of the saw 1 is a roller 31 interacting with the back surface of the saw 1 The opposite end of the case 28 enters the slot of a strip 32 which is connected with the case 28 by an adjusting bolt 33. This bolt is provided for adjusting the distance between the strip 32 and the case 28 which must be sufficient for the free passage of the saw 1 between the supporting elements 13, 14 and the roller 31. This distance depends on the maximum allowable variations in the width of the saw 1.

The end of the rod 29 at the side of the case 28 has a thread on which a nut 34 and a washer 35 are placed. Installed between said washer and the head of the bolt 33 is a spring 36. The force of this spring is selected so as to ensure the required clamping of the back surface of the saw 1 without blunting the points of the teeth resting on the supporting elements 13 and 14 during the longitudinal feed. The other end of the rod 29 is provided with longitudinal slots 37 which interact with an element 38 which fixes the position of the rod 29 with relation to the supporting elements 13 and 14. A setting spring 39 installed on the rod 29 between the nut 34 and the wall of the lower part 15' of the body ensures the required preliminary pressing of the saw 1 against the supporting elements 13 and 14.

Figure 6:
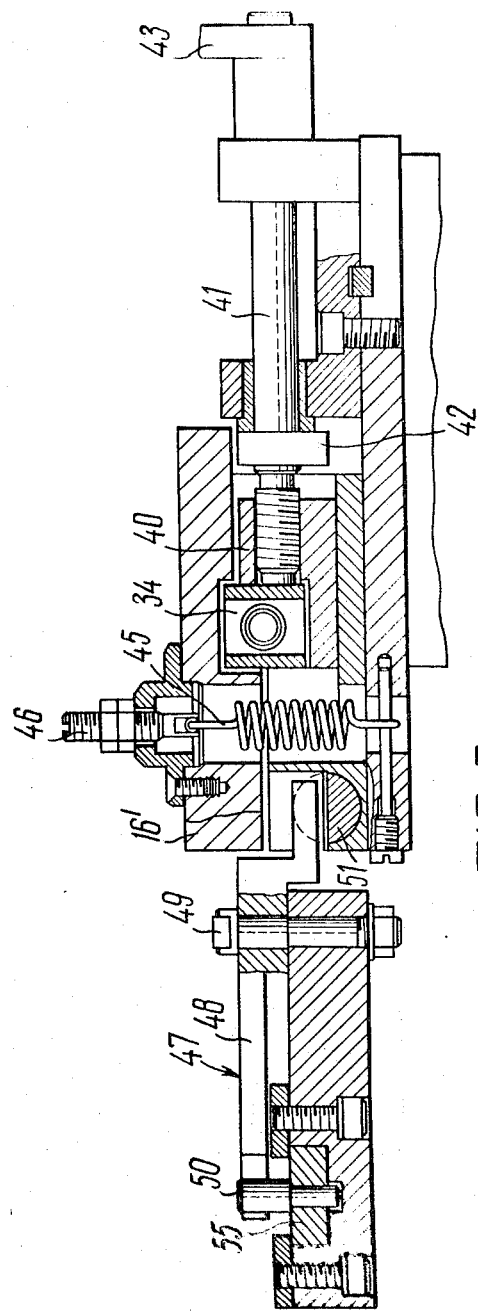
FIG.6 is a section taken along line VI—VI in FIG.4.

The position of the nut 34 with the rod 29 is fixed by a nut located on an axle 41 (FIG.6) on which an eccentric 42 and a handle 43 are installed. This handle is used to turn the axle 41 around the hinge 44 for opening the lower part 15' and upper part 16' of the body while putting in the saw 1.

The upper part 16' and lower part 15' of the body are loaded with a spring 45 whose tension is adjusted by a bolt 46.

Figure 7:
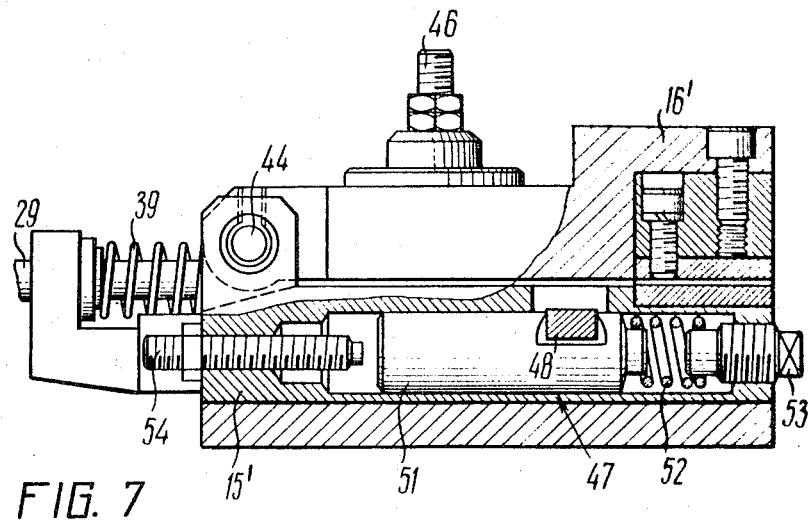
FIG.7 is a section taken along line VII-VII in FIG.4.

An additional appliance 47 for holding the back surface of the saw 1 consists of a lower 48 (FIGS. 4, 6, 7) whose fulcrum 49 is secured on the lower part 15' of the body across the back surface of the saw 1. One end of this lever interacts with the fulcrum 50 while its other end enters the slot of a slider 51 installed in the guides located in the lower part 15' of the body before the grinding wheel 4 in the direction of the pitch feed. These guides are arranged in the body in the direction perpendicular to the blade of the saw 1.

At one side the slider 51 is loaded by a spring 52 whose force is adjusted by a bolt 53 while at the other side its movement is limited by an adjusting bolt 54.

Freely installed in the lower part 15' of the body is a part 55 accommodating the fulcrum 50 and the supporting roller 56.

The supporting roller 56, the part 55 and the fulcrum 50 form a unit which can be replaced as a whole while switching over to grinding a saw of a different width.

The installation of an additional appliance 12 (47) ensures stable geometry of the teeth along the entire length of the saw 1.

Making the additional appliance in the form of a lever 48 allows the lower part 15' and upper part 16' of the body to be of a stepped shape, the smaller step accommodating the lever 48 of the additional appliance 47. The slider 51 of the lever 48 and its adjusting bolts 53, 54 are accommodated in a larger step which means that all the basic elements of the appliance are shifted from the grinding wheel into the wider part of the body which affords maximum protection against abrasive dust. This allows the housing 57 (FIG.2) of the grinding wheel 4 to be installed in the narrower part of the body, thus closing the wheel around 360°. The housing 57 has a hinged cover 58 turning around a pivot 59.

Figure 4:
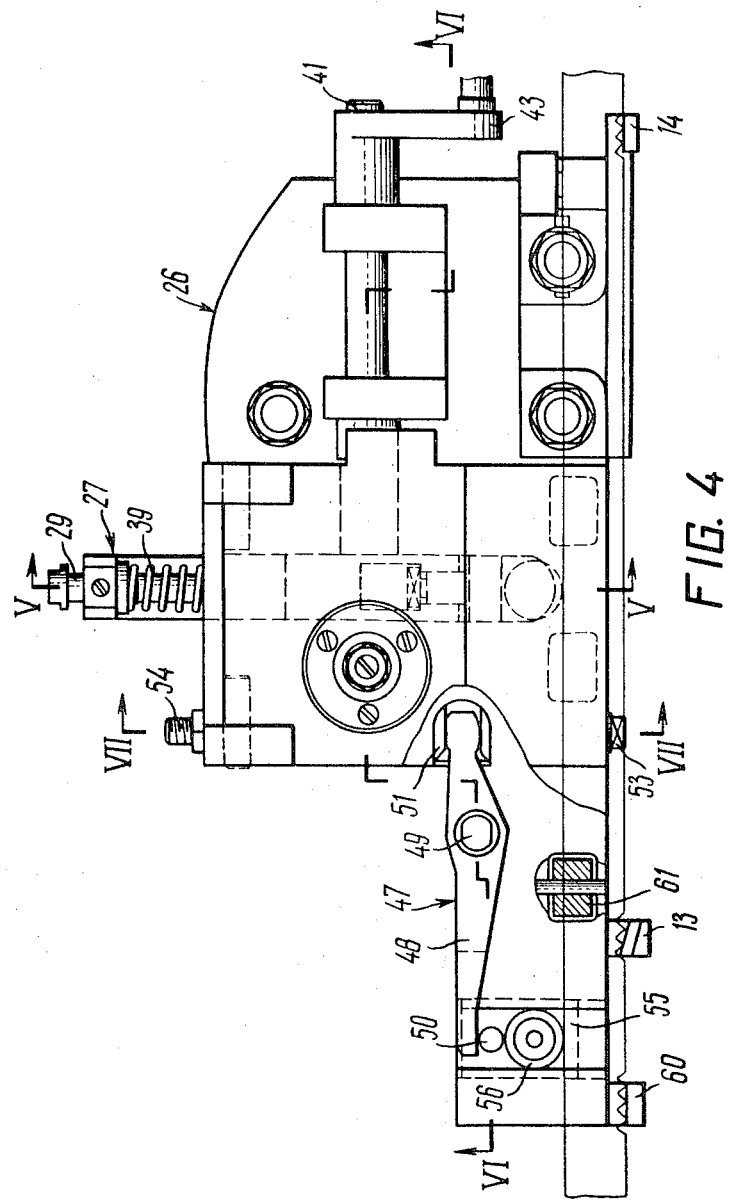
FIG. 4 is a top view of the band saw grinder according to the invention with the second version of the additional appliance.
Figure 5:
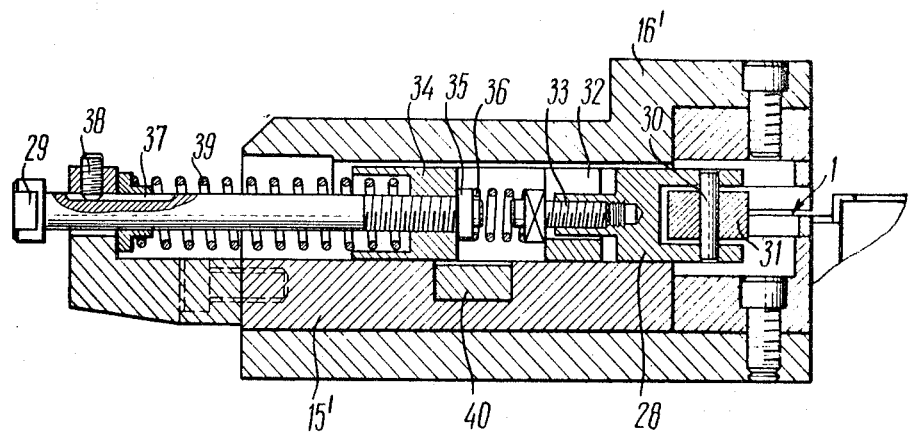
FIG. 5 is a section taken along line V—V in FIG.4.

For grinding short saws on the machine with an additional appliance 47 for holding the back surface of the saw it is necessary to install an additional supporting element 60 (FIG.4). This element is installed before the supporting element 13 which is located near the grinding wheel 4. To ensure grinding of all the teeth of a short saw, the distance between the additional supporting element 60 and the supporting element 13 is selected to be as small as possible, just sufficient for the passage of the grinding wheel 4; in this case the supporting roller 56 of the additional appliance 47 is installed between these elements.

The band saw grinder operates as follows.

On turning the handle 43 (FIGS. 4 – 7) connected with the axle 41 which carries the eccentric 42 and the nut 40, the upper part 16' of the body turns arround the hinge 44 and the nut 40 releases the nut 34. Then the saw 1 is placed on the lower guide which carries the roller 61 of the appliance 10. At the moment of placing the saw 1 the roller 31 together with the case 28, strip 32, nut 34 and rod 29 move backward. Besides, the roller 56 with the part 55 and the lever 48 also move backward, pulling back the slider 51. When the saw 1 has already been placed, the springs 39 and 52 return forward the case 28, strip 32, nut 34, rod 29 and roller 56 with the part 55 and press the saw 1 against the supporting elements 13 and 14. Then the upper part 16' of the body is lowered on the side surface of the saw 1 by turning the handle 43 through a certain angle and simultaneously the nut 34 is locked by the nut 40. After these operations the saw 1 is clamped over its side surfaces between the guides with rollers 61 while from the back side and from the side of the teeth it is clamped between the rollers 31, 56 of the appliances 27 and 47, respectively, and the supporting elements 14, 13.

After clamping the saw 1 the crank 62 of the feed mechanism 5 is set to the required eccentricity $e$ (FIG.2) which is selected to suit the depth of the saw tooth. At the same time the feed pitch relative to the grinding wheel 4 is set automatically; for returning the saw under the effect of the cutting force in the direction contrary to the pitch feed this feed should be larger than the saw pitch by the value not exceeding the saw pitch.

Having placed the saw 1 and adjusting the feed mechanisms 5, 6, the grinder drive (not shown) is started and the feed mechanisms 5, 6 are set in motion. The drive (not shown) for rotating the grinding wheel 4 is also started.

Figure 8:
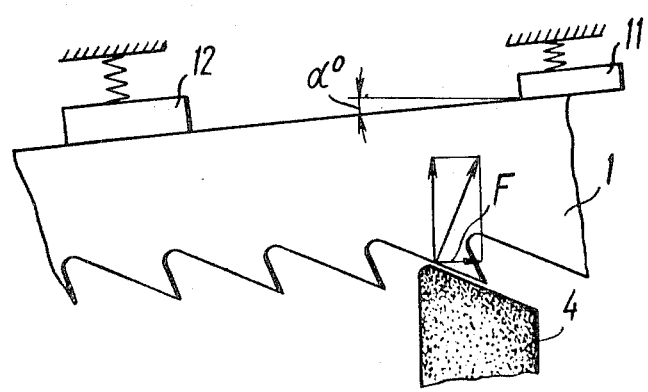
FIG.8 shows the forces acting on the saw while it is being turned away from the grinding wheel.
Figure 9:
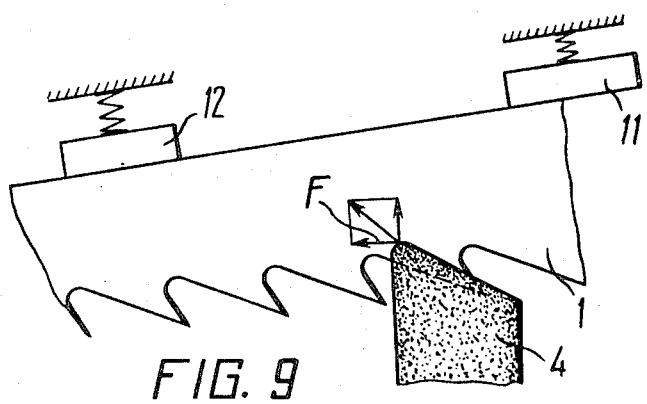
FIG.9 shows the forces acting on the saw while it is being turned onto the grinding wheel by the additional appliance.

As the saw 1 is being fed onto the grinding wheel 4, the saw first moves back from said wheel 4 due to compression of the springs 36, 52 of the rollers 31, 56, respectively. Intensive grinding of the tooth begins at a maximum possible saw turning angle $\alpha$ (FIG.8). While the rear side of the tooth is being ground, the horizontal component F of the cutting force diminishes and, during grinding of the tooth space, it changes its direction (FIG.9). As the wheel side facing the front side of the next tooth starts working, the horizontal component F of the cutting force increases and the vertical component decreases. As a result, the springs 36, 52 extend and turn the saw 1, feeding it onto the grinding wheel 4. Turning of the saw ensures an additional removal of metal from the rear side of the tooth both at its point and near the space, i.e., it restores the tooth geometry.

If during grinding the saw 1 has to be turned counterclockwise with relation to the front supporting element 13, the pressing force of the additional appliance 47 with the roller 56 is made stronger than that of the appliance 27 with the roller 31. When the saw 1 is turned clockwise relative to the front supporting element 13, the pressing force of the additional appliance 47 with the roller 56 is made weaker than that of the appliance 27 with the roller 31.

The direction of saw turning in the course of grinding can be changed not only by changing the force of the additional appliance but also by changing the arm ratio of the appliances 27 and 47 relative to the grinding wheel 4.

If necessary, there may be more than two appliances for holding the saw from the back side.

The grinder with the appliances 11, 12 for holding the back surface of the saw operates similarly to the abovedescribed machine.

What is claimed is:

1. A band saw grinder comprising a bed; a grinding head with a grinding wheel mounted on said bed; an infeed mechanism for moving said saw onto said grinding wheel, a mechanism for longitudinal pitch feed of said saw relative to said grinding wheel; a carriage mounted on said bed and carrying said feed mechanisms; a saw-holding device mounted on said carriage and comprising a body, a flexible appliance for holding the side surfaces of the saw, located in said body, a flexible appliance for holding the back surface of the saw, located in said body in front of said grinding wheel in the direction of pitch feed, an additional flexible appliance for holding the back surface of the saw, mounted in said body, a supporting roller of said additional appliance which is in constant flexible contact with the back surface of the saw in the course of grinding and is installed after the grinding wheel in the direction of pitch feed, two supporting elements for the points of the saw teeth, secured on said body, one of said elements being located near said grinding wheel while the other one, at a certain distance from it in the direction contrary to pitch feed; drives of said feed mechanisms.

2. A band saw grinder according to claim 1 wherein the additional flexible appliance consists of a lever whose fulcrum is secured in the body in the direction across the back surface of the saw, said lever carrying a supporting roller which contacts said surface of the saw, and a spring-loaded slider installed before the grinding wheel in the guides arranged in the body across the saw blade and provided with a slot for connection with the end of the lever intended for turning the latter.

3. A band saw grinder according to claim 2 wherein the body accommodating the flexible saw-holding appliances is of a stepped shape, the smaller step accommodating the lever of the additional appliance; in this case the wheel housing is of a split construction and secured on this step of the body.

4. A band saw grinder according to the claim 1 wherein an additional supporting element is installed before the supporting element located near the grinding wheel in the direction of the pitch feed whereas the supporting roller of the additional appliance is located between these supporting elements thus providing for grinding the saws with short blades.

* * * * *